Jan. 2, 1973  J. F. LOOS ET AL  3,708,345
ELECTROCHEMICAL ENERGY CONVERSION SYSTEM
Filed Jan. 8, 1970  2 Sheets-Sheet 1

INVENTORS
JOHN F. LOOS
TRUMAN F. UNKLE JR.

Anderson, Luedeka, Fitch, Even & Tabin
ATTYS.

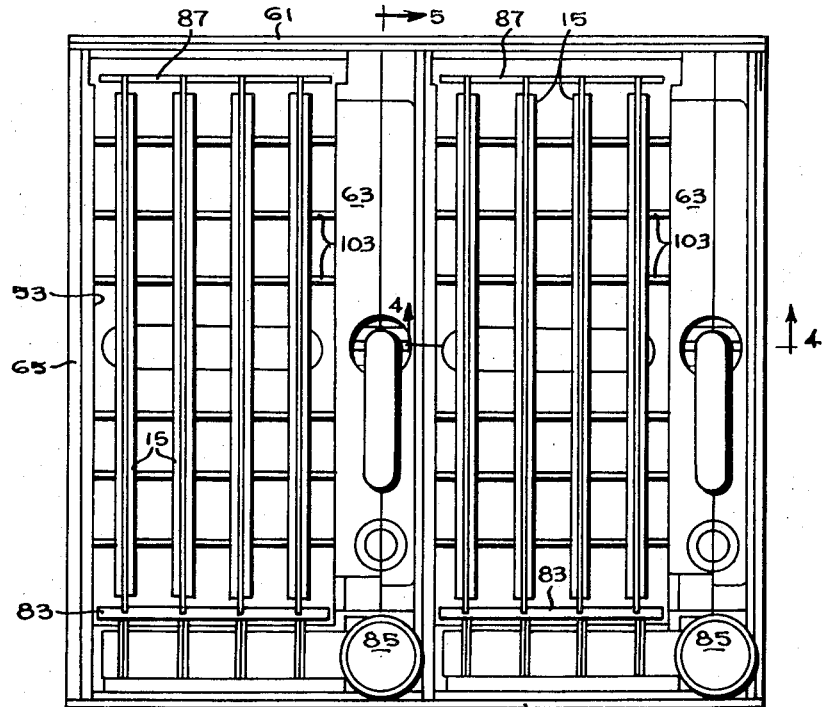
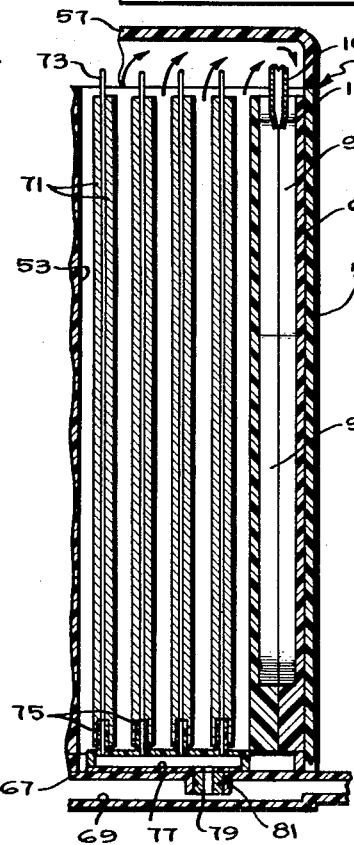
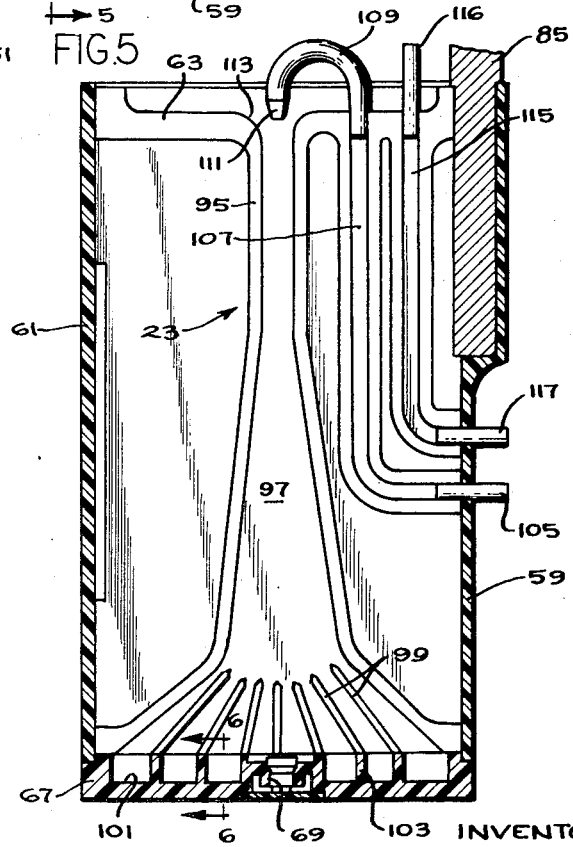

United States Patent Office 3,708,345
Patented Jan. 2, 1973

3,708,345
ELECTROCHEMICAL ENERGY CONVERSION SYSTEM
John F. Loos, San Diego, and Truman F. Unkle, Jr., Poway, Calif., assignors to Gulf Oil Corporation
Filed Jan. 8, 1970, Ser. No. 1,348
Int. Cl. H01m 31/02
U.S. Cl. 136—160
10 Claims

ABSTRACT OF THE DISCLOSURE

An energy conversion system utilizing a plurality of electrochemical cells employing the zinc-oxygen electrochemical couple and a circulating alkaline electrolyte which is pumped through the cells to remove the zinc oxide reaction products therefrom. A high electrolyte flow rate is achieved through each of the cells, which scours the zinc oxide reaction products from the zinc anodes, by providing a jet pump in association with each electrochemical cell unit. The individual jet pumps transform a relatively low flow rate of high pressure liquid electrolyte from a high pressure pump into a substantially higher circulation flow of low pressure electrolyte within each of the individual electrochemical cells.

---

This invention relates to electrochemical cells and more particularly to an energy conversion unit utilizing a plurality of electrochemical cells using the zinc-oxygen electrochemical couple.

Various electrochemical cells have been developed which employ metallic zinc as the anode for the generation of electrical power. One such rechargeable energy conversion system is illustrated in U.S. Pat. 3,359,136, which system employs an aqueous alkaline electrolyte and supplies oxygen by feeding an oxygen-containing gas to a porous electrode structure. Another example is the zinc-silver oxide storage battery wherein the oxygen is provided by the silver oxide cathodes which are in contact with an aqueous potassium hydroxide electrolyte. Other oxides, such as nickel oxide or hydroxide for example, may also be employed as a source of oxygen for an electrochemical cell utilizing zinc and an aqueous alkaline electrolyte or some other suitable liquid electrolyte.

The reaction product of the zinc-oxygen electrochemical couple in the generation of power is considered to be zinc oxide, which is created in the electrochemical cell at the zinc anode. The zinc oxide, although fairly soluble in an alkaline electrolyte, is not readily removed from the surfaces of the zinc electrode, and buildup of zinc oxide reaction products on the electrodes results in zinc passivation. Electrochemical cell systems which have improved operation in this respect are desired.

In energy conversion systems utilizing a plurality of separate electrochemical cells and a circulating electrolyte system, the separate cells are normally arranged in fluid parallel flow via a manifold system from a main pump. When the separate cells are connected electrically in series, the cells will be at different potentials, and current leakage through the electrolyte results in attendant loss of power. Although increasing the length of the conduits from each of the cells to the manifold reduces such current leakage, it results in increased pressure drop and increased pumping power demands. Other solutions are desired.

It is an object of the present invention to provide an improved electrochemical cell utilizing the zinc-oxygen electrochemical couple and a liquid electrolyte. It is a further object of this invention to provide an energy conversion system utilizing a plurality of such electrochemical cells designed for the efficient generation of electrical power over a reasonably long duration of time. Another object is to provide an energy conversion system utilizing a circulating electrolyte wherein current leakage losses between separate cells are reduced.

These and other objects of the invention should be readily apparent from a careful reading of the following detailed description in conjunction with the accompanying drawings wherein:

FIG. 3 is an enlarged plan view of the electrochemical cells shown in FIG. 2 with the upper cap removed;

FIG. 4 is a sectional view taken generally along the lines of 4—4 of FIG. 3;

FIG. 5 is a sectional view taken generally along the lines of 5—5 of FIG. 3; and FIG. 6 is a fragmentary sectional view taken along lines 6—6 of FIG. 5.

Figure 1:
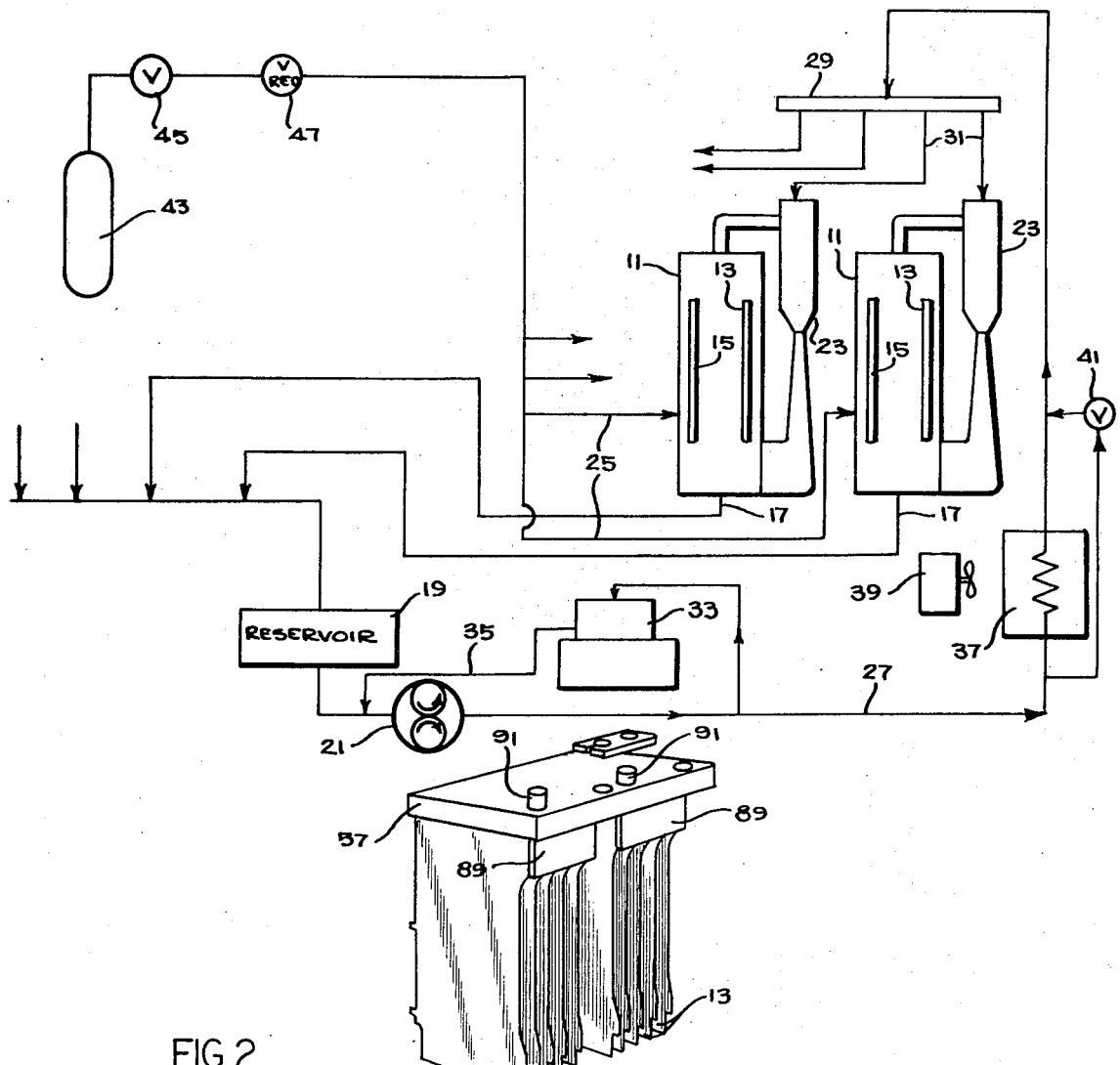
FIG. 1 is a schematic flow diagram of an energy conversion system for the generation of electrical power including a plurality of electrochemical cell units.
Figure 2:
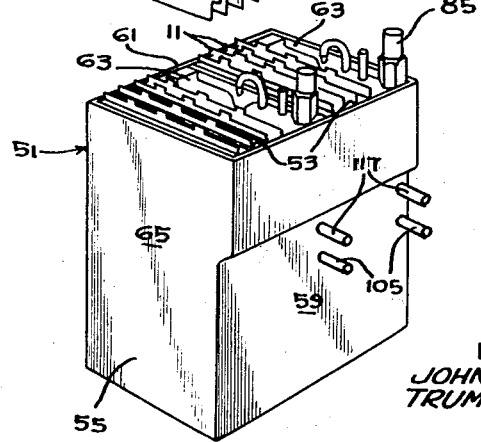
FIG. 2 is a fragmentary exploded perspective view of a plurality of the electrochemical cell units shown in FIG. 1.

Illustrated schematically in FIG. 1 is an energy conversion system which utilizes a recirculation electrolyte system for removing the zinc oxide reaction products from a plurality of individual electrochemical cell units 11. In the illustrated system two cells units 11 are shown each containing at least one zinc electrode 13 and one oxygen-providing electrode 15. Each of the cell units 11 is operated at about atmospheric pressure, as electrolyte outlets 17 from each cell are connected to an electrolyte reservoir 19 which is at atmospheric pressure. It has been found that excellent power generation is achieved over a long duration of operation by maintaining a circulation or movement of the liquid electrolyte past the surfaces of the zinc electrodes 13 at a relatively high flow rate. It is not considered economical to pump the necessary large quantity of liquid electrolyte from the reservoir 19 through each of the cell units 11 in order to obtain the internal flow rates considered desirable, but it has been found that a high pressure pump 21, drawing its suction from the reservoir 19, can economically provide the desired internal circulation rates if it is used in combination with a plurality of jet pumps 23 or the like, one of which is associated with each individual electrochemical cell unit 11.

In the energy conversion system schematically illustrated in FIG. 1, only two cell units 11 are shown to illustrate the functioning of the system, but it should be understood that any number of cell units desired may be used. The term, energy conversion system, is employed to generically define the environment wherein the inventive concept might be employed. The system, as previously indicated, employs zinc electrodes, oxygen-providing electrodes and a liquid alkaline electrolyte. In the embodiment illustrated in FIG. 1, the oxygen-providing electrodes 15 are in the form of porous structures, and an oxygen-containing gas, such as oxygen or air, is supplied to the porous structures through conduits 25. Such a system might be termed a hybrid battery-fuel cell, and if provision is included in the system for replating the zinc onto the zinc electrodes 13 after discharge, it might be termed a regenerative fuel cell. Although the illustrated embodiment is not intended to be recharged in situ, provision for replating the zinc onto the discharged zinc electrodes could be incorporated in accordance with the teaching of U.S. Pat. 3,359,136, if desired. On the other hand, if the oxygen for the electrochemical reaction is provided by the use of nickel oxide electrodes or the like, the system might be more commonly termed a battery, either primary or secondary, depending on whether provision for recharging is incorporated.

As should be apparent from the discussion hereinafter, the inventive concept is considered to be applicable to any energy conversion system employing the zinc-oxygen electrochemical couple and a liquid electrolyte. For purposes of simplification of terminology, and inasmuch as the illustrated system is not designed to be recharged in situ, the zinc electrodes are sometimes hereinafter referred to as the anodes, and the oxygen-providing electrodes are sometimes hereinafter referred to as the cathodes.

The two illustrated cell units 11 are connected hydraulically in parallel in respect of the electrolyte recirculation system. The liquid alkaline electrolyte, which might for example be an aqueous potassium hydroxide solution, is stored in the reservoir 19. The high pressure pump 21, which may be a gear pump, takes its suction or intake from the reservoir 19 and discharges through line 27 which leads to a manifold 29 including a plurality of lines 31 leading to the individual cell units 11. The electrolyte stream leaving the electrochemical cells carries suspended zinc oxide reaction products created therein. Because there is a practical limit to the volume of electrolyte than can economically be included within a particular system, which in turn limits the physical capacity of the electrolyte for carrying suspended solids, a portion of the electrolyte stream leaving the pump 21 is split off from the main stream. The diverted portion from line 37 is routed through a separation and storage device 33. As more fully explained in U.S. Pat. 3,359,136, the suspended zinc oxide reaction products are mechanically separated from the liquid electrolyte in a form where they are available for recharging the zinc electrodes, and the electrolyte is returned through a line 35 to the suction side of the high pressure pump 21. The separated reaction products may be conveniently stored in or below the mechanical separator, as in a removable canister.

Depending upon the climate wherein the system will be employed and the anticipated duration of continuous use of the system, the temperature of the recirculating electrolyte stream might rise to a degree higher than desired. Thus, a cooler or evaporator 37 is provided together with an auxiliary fan 39. Flow through the cooler 37 is controlled by a by-pass control valve 41 so that the cooler is used only when needed. The control valve 41 may be controlled thermostatically or in any suitable fashion by means well known in the art, and likewise the fan 39 may be actuated only when needed, as by the inclusion of a fluid pressure valve or the like.

The main electrolyte stream from the high pressure pump 21 enters the manifold 29 where it is split into a plurality of separate streams leading through the lines 31 to the individual cell units 11. The high pressure lines 31 are relatively small in diameter and respectively terminate at the nozzles of jet pumps 23 which are associated with each cell unit.

As is shown schematically in FIG. 1, each jet pump 23 has its discharge outlet in fluid communication with a location at one side of the electrochemical cell and directs a substantial circulation stream through the cell to the opposite side thereof. Preferably, the jet pump 23 is directed downward and discharges into the enclosure at a location adjacent the bottom wall thereof. The intake to the jet pump 23 is adjacent the upper wall of the enclosure, through which intake electrolyte from the enclosure is drawn into the mixing chamber of the jet pump and mixed with the high pressure liquid stream. The same volume of electrolyte entering each cell unit 11 through the high pressure feed line 31 exists from the cell through its outlet line 17 which leads to the reservoir 19.

In the illustrated embodiment, gaseous oxygen is fed to the cathodes 15 in each of the cell units. The oxygen is supplied from a suitable source 43 and may be stored as a high pressure gas or in liquid form in a cryogenic container. In either instance, the oxygen normally passes through a shutoff valve 45 and a pressure regulator 47 and then to the individual branch conduits 25 which lead to the separate cell units 11. The pressure regulator 47 is set to control the oxygen pressure to a value just high enough so that the oxygen diffuses to the surface of the porous cathodes 15. Normally, the flow of oxygen should be essentially zero when there is no current being drawn from the cell units. Oxygen flow begins and continues when oxygen is removed from the surface of the porous electrode structures as the electrochemical reaction proceeds.

In general, start-up of the energy conversion system is relatively simple. The system is ready to operate when the oxygen shutoff valve 45 is opened to supply oxygen to the cathodes 15 at the proper pressure. Start-up of the electrolyte circulation high pressure pump 21 generally follows, inasmuch as the pump 21 may be driven by a motor electrically connected to draw its energy from the output of the cell units. It may be desirable to start the motor for the pump 21 from an ancillary source of power and then shift it to the power being generated as soon as the voltage rises to a suitable level. So long as the oxygen supply lasts and there is metallic zinc remaining the anodes 13, the system should continue to supply electrical energy as needed.

As previously indicated, the illustrated embodiment is not designed to be recharged in situ, and the contemplated recharging of the system is explained in somewhat more detail hereinafter. However, briefly, the fabrication of the cell units 11 is such that the electroplated zinc anodes are designed to be replaced with fresh zinc anodes. At the time of replacement, the oxygen supply will be replenished if necessary, and the separated zinc oxide reaction products would normally be emptied from the removable storage canister below the separation device 33. It is contemplated that some central facility will be provided wherein the recovered zinc oxide reaction products would be used in the electroplating of metallic zinc back onto the anode substructures.

In FIGS. 2 through 5 of the drawings, there is shown an illustrative example of a preferred construction for the cell units 11. Illustrated is a compartmented housing 51 which includes a plurality of separate enclosures 53 each of which contains a composite electrochemical cell. It should be understood that the total number of cells included in one housing 51 is theoretically limited only by the design characteristics of the energy conversion system. Within each individual enclosure 53, the electrodes are connected in parallel, thus providing an output of about 1.4 to 1.5 volts. The individual cell units 11 are electrically connected in series with one another, and a sufficient number of cell units 11 may be provided so that the assembly has a design output of nearly any reasonable voltage.

The housing 51 is made of a suitable electrically insulating material which is chemically resistant to the electrolyte. A preferred material is polysulfone; however, other thermoplastic materials and/or rubber materials can be used, such as are well known in the battery art. Basically, the housing 51 consists of a lower casing portion 55 and an upper cap portion 57. Inasmuch as each of the individual enclosures 53 for the separate cell units 11 is a substantial duplicate of the others, the discussion is hereinafter limited to one of the enclosures 53 and its associated cell unit.

Each individual enclosure 53 has a front wall 59, a rear wall 61, a pair of side walls 63 and 65 and a bottom wall 67. The top of the enclosure 53 is closed by the cap portion 57. Latches (not shown) carried by the casing cooperate with keeper plates (not shown) carried by the cap portion 57 to clamp the cap in fluidtight relationship with the lower casing. Suitable gasketing is provided along the periphery of the junction therebetween.

In the illustrated embodiment, the bottom wall 67 has formed in the central portion thereof a passageway 69 that runs longitudinally and supplies oxygen or air to the cathodes of each electrochemical cell unit 11. As best seen in FIG. 4, each of the individual cathodes 15 is made up of a pair of flat porous nickel plates 71 which may be made of sintered particles of nickel as is fairly well known in the art. A spacer frame 73 is disposed between each pair of porous plates 71 and is generally in the form of a peripheral gasket which extends around the perimeter of the plates and provides a hollow central plenum chamber for the oxygen. A small inlet fitting 75 is provided at the bottom of each individual cathode 15 which fitting is suitably connected to a manifold 77. The manifold 77 contains a depending hollow plug 79 which fits into a receptacle 81 formed in the bottom wall 67 of each encolsure leading to the oxygen supply passageway 69.

The individual cathodes 15 in each enclosure 53 are electrically interconnected in parallel by a current collector 83 that is attached to one edge of each of the individual cathodes. The collector 83 includes an upstanding post 85 which extends through a hole in the cap 57 where electrical interconnection is made as described hereinafter. In the disclosed assembly, retainers 87 are also suitably connected to the lower portions of the individual cathodes along the opposite side edges to assure that uniform spacing therebetween is maintained.

The cap 57 contains a pair of holes for each enclosure through which the positive and negative current collectors pass. The post 85 passes through one hole, and a current collector 89 which is connected to the zinc anodes 13 contains an upstanding terminal or post 91 which passes through an adjacent hole in the cap 57. Suitable connectors are fit downward over the posts 85 and 91 of adjacent cell units. Thus, the adjacent cell units 11 are placed in series electrical connection, with the anodes of one cell unit being connected to the cathodes of the next cell unit.

The current collector 89 has mountings which connect to the side edges of each of the five zinc electrodes 13 that are disposed in each enclosure. In the illustrated cell unit 11, there are three double-faced zinc electrodes 13 and a pair of single-faced electrodes 13' in flanking relation thereto. The three central electrodes 13 each include a flat thin backing plate of mild steel which has electroplated on both surfaces thereof a deposit of metallic zinc. The two outside or flanking single-faced electrodes 13' are made of similar backing sheets of thin mild steel but have zinc electrodeposited on only one surface thereof, that surface facing inward toward the adjacent oxygen electrode 15. Although the zinc electrodes 13 and 13' are not shown in FIGS. 3 and 4 for purposes of simplification, it will be appreciated that they depend into the gaps adjacent the cathodes and are uniformly spaced from each surface of the cathodes to allow electrolyte flow therebetween.

The elements of each jet pump 23 are formed in the side wall 63 of each enclosure 53, which side wall also serves to separate one enclosure from the next adjacent enclosure in an array containing a plurality of these enclosures. As best seen in FIG. 5, the jet pump 23 includes a neck section 95 which is substantially circular in cross section and is of substantially constant diameter for its initial length. This neck section 95 serves as the mixing chamber for the jet pump 23. At its lower end, the neck section 95 is joined to a diffuser section 97 which opens smoothly outward, becoming oval in cross section until a short distance from the bottom end thereof. At this point the diffuser section 97 flares radially outward to the full width of the side wall 63. A plurality of vanes 99 are provided to assure the liquid electrolyte is evenly distributed across the enclosure.

As seen in FIG. 6, there is an opening 100 at the bottom of the side wall 63 through which the electrolyte being pumped enters the bottom of the enclosure 53. The bottom wall of each enclosure is formed with a depression 101 of curved configuration that directions the electrolyte flow across the cell. Also formed in the bottom wall 67 in the region of depression 101 are a plurality of upstanding ribs 103. These ribs 103 extend the length of the depression, as seen in FIGS. 3 and 6, and aid in assuring even flow distribution across the enclosure.

The inlet line 31 from the high pressure pump 21 enters through a fitting 105 embedded in the front wall 59 and is directed upward in a passageway 107 molded as a part of the side wall 63. Passageway 107 connects with a U-shaped tube 109 that terminates in a nozzle 111 which is located at about the center of the entrance 113 to the neck section 95, as best seen in FIG. 5. Thus, the location of the nozzle 111 directs a jet of high velocity electrolyte into the mixing chamber of the jet pump 23.

The electrolyte flowing through the diffuser section 97 of the jet pump 23 is smoothly directed through the opening 100 provided by the depression 101 in relatively uniform distribution across the enclosure 53. The electrolyte flows upward in the spaces between the anodes and the cathodes to the region provided by the hollow underside of the cap 57. As much electrolyte as is pumped through the nozzle 111 must exit from the enclosure 53, and an outlet passageway 115 is also molded into each side wall 63. An extension 116 at the inlet end of the passageway 115 displaces it slightly further from the entrance 113 to the mixing chamber. The outlet passageway 115 leads to an outlet fitting 117 which is provided in the front wall 59 of the casing 55 near the inlet fitting 105. Each outlet fitting 117 connects to one of the lines 17 leading back to the electrolyte storage reservoir 19.

In operation, the discharge of the high pressure stream of the electrolyte through the orifice at the end of the nozzle 111 directs a jet of high velocity liquid into the neck section 95 of the jet pump 23. The jet of liquid exiting from the nozzle 111 draws liquid from the upper portion of the enclosure through the entrance 113 and creates turbulent mixing with the electrolyte already present in this region serving as the mixing chamber. The mixing creates a transfer of energy from the high pressure, low volume inlet stream moving through the inlet passageway 107 to the liquid electrolyte already within the enclosure which is at about atmospheric pressure. The diffuser section 97 converts the fairly high velocity stream from the neck section into pressure energy creating a wider stream of liquid across the entire width of the enclosure of substantial flow rate. Thus, the jet pump 23 and its associated inlet and outlet provides a recirculation path for electrolyte flow for each separate enclosure 53, the volume of flow within any individual cell unit being substantially larger than the volume of high pressure liquid electrolyte being fed to each nozzle 111.

For example, in a cell enclosure 53 wherein the volume of the region in which the electrodes are located measures approximately 4 inches by 8 inches by 1.6 inches, a recirculation flow rate with the enclosure of at least about 4 gallons per minute is considered acceptable from an electrochemical standpoint, and a flow rate between about 8 and 10 gallons per minute is preferred. Recirculation flow rates within the enclosure in this range may be accomplished using a high pressure inlet liquid flow rate of only about 10 to 15 percent of that amount. Of course, there are a number of variables which affect the performance of a jet pump, and many of these are independent of one another, so that it is not realistic to place limiting values on individual variables. However, there must be a substantial pressure head for the driving liquid at the nozzle, and in general, the pressure at the nozzle should be at least about 40 p.s.i. (2.72 atm.) above that of the liquid being driven.

Guidance to acceptable jet pump design may be had from the following set of parameters which are considered suitable. For a jet pump 23 where in the neck section 95 has a diameter of about ⅜ inch and the dimensions at the end of the diffuser section 97 are approximately that of a rectangle approximately 0.4 inch by 3.6 inches, the length of the neck section may be about 4 to 6 times its diameter and the angle of diffusion about 10°. The ratio of nozzle area to the neck section area may be about 0.015 to 0.025. Moreover, the radius of curvature of the entrance 113 to the neck section 95 of the jet pump 23 should be about one-quarter to one-half of the neck section diameter to reduce entrance losses. However, the ratio of the area of the diffuser entrance (the neck section 95 area) to the diffuser exit is more important to assure efficient performance, and this ratio should be between about 2.5 to 1 and about 3 to 1.

As previously indicated, the shape of the depression 101 in the bottom wall 67 of the enclosure helps to distribute the liquid stream leaving the diffuser section 97 to all of the vertical electrolyte passageways between electrodes. The ribs 103 further insure uniform distribution across the cell unit 11. The recirculating stream of electrolyte moves vertically upward in the enclosure, effectively scrubbing the surfaces of the zinc anodes 13 and removing the zinc oxide reaction products as they are formed.

One such cell unit is tested under continuous operation at a voltage of 1 v. and an amperage equal to about 0.5 amp. per sq. cm. of electrode surface area, using a high pressure electrolyte inlet flow rate of about 0.5 g.p.m. which creates a circulation flow within the enclosure 53 at a flow rate of about 4 g.p.m. Testing shows that there is substantially no decrease in power output throughout operation for about 1 hour. The cell unit operating in the aforementioned manner is considered to be excellently suited for various electrical power generation uses, particularly the powering of land vehicles.

Various of the features of the invention are set forth in the claims which follow.

What is claimed is:

1. In an energy conversion unit which includes a plurality of electrochemical cells, each cell having a zinc electrode and an oxygen-providing electrode, and which also includes a reservoir of liquid electrolyte and a pump having its intake in fluid communication with said reservoir for circulating liquid electrolyte through said electrochemical cells, the improvement which comprises an enclosure containing at least one of said electrochemical cells, jet pump means in association with said enclosure, said jet pump means including a nozzle and a mixing chamber and a diffuser connected in series, and electrolyte inlet means connecting the discharge of said pump to said nozzle so that discharge into said jet pump means of a given volume of electrolyte from said pump creates circulation of a substantially larger volume of electrolyte than said given volume past said zinc electrode within said enclosure.

2. The invention in accordance with claim 1 wherein said mixing chamber and said diffuser are formed as a part of a first wall of said enclosure and wherein guide means is formed as a part of a wall generally perpendicular to said first wall, which guide means directs the electrolyte discharging from the diffuser past said zinc electrode to a third wall of said enclosure also generally perpendicular to said first wall, an entrance into said mixing chamber at about the region of said nozzle being provided at said third wall.

3. The invention in accordance with claim 2 wherein a plurality of zinc and oxygen-providing electrodes are provided within said enclosure, said zinc electrodes being in the form of a group of generally flat parallel plates of zinc which are disposed generally parallel to said first wall.

4. The invention in accordance with claim 3 wherein said flat plates are vertically disposed.

5. The invention in accordance with claim 4 wherein said nozzle is located to direct said jet vertically downward toward said second wall which lies at the bottom of said enclosure.

6. The invention in accordance with claim 4 wherein said zinc electrodes include flat backing plates having metallic zinc plated upon both surfaces thereof, and wherein said oxygen-providing electrodes include pairs of generally flat porous plates and means providing a plenum chamber between said porous plates through which an oxygen-containing gas is supplied to said porous plates.

7. The invention in accordance with claim 6 wherein said enclosure includes a separable cap assembly and wherein said zinc electrodes are electrically interconnected and supported in said enclosure via mounting to said separable cap assembly.

8. In an energy conversion unit having a plurality of electrochemical cells, each cell having a zinc electrode, an oxygen-providing electrode and a liquid electrolyte, which unit also has liquid electrolyte reservoir means, the improvement which comprises the combination of a high pressure pump having its intake in fluid communication with said reservoir means, a plurality of enclosures each containing at least one of said electrochemical cells and each having an electrolyte outlet, means connecting each of said electrolyte outlets to said reservoir means, jet pump means in association with each of said enclosures, and manifold means connecting each of said jet pump means to the dischargre of said high pressure pump, whereby the high pressure feed of a given volume of electrolyte to each jet pump means creates a flow of a substantially larger volume of electrolyte than said given volume past said zinc electrode within said associated enclosure.

9. The invention in accordance with claim 8 wherein said high pressure pump feeds liquid electrolyte to said jet pump means at a pressure at least about 40 p.s.i. above the pressure of the liquid electrolyte within said enclosure.

10. The invention in accordance with claim 8 wherein said jet pump means is located in a recirculation path at a location exterior of said enclosure with said jet pump directed downward and with the mixing chamber of said jet pump means opening into the upper portion of said enclosure.

References Cited

UNITED STATES PATENTS

| | | | |
|---|---|---|---|
| 3,359,136 | 12/1967 | Merten et al. | 136—160 |
| 3,542,598 | 11/1970 | White et al. | 136—160 |
| 3,238,070 | 3/1966 | Porter | 136—160 |
| 3,554,810 | 1/1971 | Zaromb | 136—160 |

DONALD L. WALTON, Primary Examiner

U.S. Cl. X.R.

136—86 A